(12) United States Patent
Ivester et al.

(10) Patent No.: US 12,086,655 B1
(45) Date of Patent: Sep. 10, 2024

(54) ATOMIC CPU ACCESS TO SHARED METADATA IN A FABRIC-ATTACHED MULTI-NODE ARRAY WITH SHARED MEMORY

(71) Applicant: Dell Products L.P., Hopkinton, MA (US)

(72) Inventors: Steve Ivester, Grafton, MA (US); Kaustubh Sahasrabudhe, Westborough, MA (US); John Creed, Innishannon (IE)

(73) Assignee: Dell Products L.P., Hopkinton, MA (US)

( * ) Notice: Subject to any disclaimer, the term of this patent is extended or adjusted under 35 U.S.C. 154(b) by 100 days.

(21) Appl. No.: 18/169,920

(22) Filed: Feb. 16, 2023

(51) Int. Cl.
*G06F 9/52* (2006.01)
*G06F 9/54* (2006.01)

(52) U.S. Cl.
CPC .............. *G06F 9/526* (2013.01); *G06F 9/544* (2013.01)

(58) Field of Classification Search
CPC ................................ G06F 9/526; G06F 9/544
See application file for complete search history.

(56) References Cited

U.S. PATENT DOCUMENTS

| | | | | |
|---|---|---|---|---|
| 11,074,113 | B1* | 7/2021 | Ivester | G06F 12/0815 |
| 2011/0040810 | A1* | 2/2011 | Kaplan | G06F 16/11 |
| | | | | 707/822 |
| 2014/0172790 | A1* | 6/2014 | Pathak | G06F 16/27 |
| | | | | 707/613 |
| 2019/0332685 | A1* | 10/2019 | Fair | G06F 16/1865 |
| 2022/0253339 | A1* | 8/2022 | Dice | G06F 9/30145 |
| 2022/0300420 | A1* | 9/2022 | Ivester | G06F 11/2053 |
| 2023/0229525 | A1* | 7/2023 | Michaud | G06F 9/526 |
| | | | | 718/102 |

* cited by examiner

*Primary Examiner* — Phong H Dang
(74) *Attorney, Agent, or Firm* — Anderson Gorecki LLP (57) ABSTRACT

A multi-node storage system uses local mutual exclusion to perform fabricless local memory access and non-local mutual exclusion to perform remote memory access via an inter-nodal fabric. A local access mode bit and remote access request flag are associated with each data slot and its associated metadata in shared memory of the storage system. Local mutual exclusion such as a Peterson Lock is used to avoid conflict between local IO threads when the local access mode is set and the remote access request flag is not set. A remote IO thread that determines that the local access mode bit for a target slot is set will set the remote access flag. In response, a local IO thread that obtains the Peterson Lock will unset the local access mode bit and release the Peterson Lock, thereby enabling remote access to the slot and its metadata by the remote IO thread. The remote access request flag is cleared and the local access mode enabled after the remote access is completed.

20 Claims, 5 Drawing Sheets

ATOMIC CPU ACCESS TO SHARED METADATA IN A FABRIC-ATTACHED MULTI-NODE ARRAY WITH SHARED MEMORY

TECHNICAL FIELD

The subject matter of this disclosure is generally related to data storage systems.

BACKGROUND

Organizational data storage systems are used to maintain storage objects that are accessed by instances of host applications running on clusters of host servers. Examples of host applications include software for email, e-business, accounting, inventory control, manufacturing control, engineering, and a variety of other business processes. Such data storage systems may have a single node architecture or a multi-node architecture. Network-Attached Storage (NAS) and Direct Attached Storage (DAS) are examples of single node architectures in which each storage server node maintains exclusive control over its processing and memory resources. Multiple single-node storage systems may be used together to increase storage capacity and input-output (IO) capabilities, but the individual storage nodes do not share processing and memory resources in a highly integrated manner. In contrast, multi-node storage systems such as Storage Area Networks (SANs) and storage arrays include multiple highly integrated storage nodes that share processing and memory resources. The multi-node architecture has a variety of advantages, but inter-nodal latency can be as much as an order of magnitude greater than intra-nodal latency.

SUMMARY

A method in accordance with some implementations comprises: identifying a need for a first IO thread to access metadata in a shared memory that is accessible by a plurality of IO threads running on a plurality of processor cores on a plurality of compute nodes that are interconnected by an inter-nodal fabric, where the compute nodes each have local memory and allocate a portion of their local memory to the shared memory; using local mutual exclusion between ones of the plurality of IO threads that are local relative to the shared memory metadata to perform fabricless local access to the shared memory metadata responsive to determining that the shared memory metadata is local to the first IO thread; and using non-local mutual exclusion between ones of the plurality of IO threads to perform a remote access to the shared memory metadata via the inter-nodal fabric responsive to determining that the shared memory metadata is remote relative to the first IO thread.

An apparatus in accordance with some implementations comprises: a plurality of compute nodes interconnected via an inter-nodal fabric and configured to manage access to non-volatile drives, each of the compute nodes comprising a plurality of processor cores, each with an IO thread, and local memory, a portion of which is allocated to a shared memory that is accessible to all the IO threads, the IO threads configured to use fabricless local mutual exclusion in association with fabricless local access to shared memory metadata in the shared memory and use non-local mutual exclusion in association with remote access to shared memory metadata in the shared memory via the inter-nodal fabric.

A non-transitory computer-readable storage medium in accordance with some implementations stores instructions that are executed by a storage system to perform a method comprising: identifying a need for a first IO thread to access metadata in a shared memory that is accessible by a plurality of IO threads running on a plurality of processor cores on a plurality of compute nodes that are interconnected by an inter-nodal fabric, where the compute nodes each have local memory and allocate a portion of their local memory to the shared memory; using local mutual exclusion between ones of the plurality of IO threads that are local relative to the shared memory metadata to perform fabricless local access to the shared memory metadata responsive to determining that the shared memory metadata is local to the first IO thread; and using non-local mutual exclusion between ones of the plurality of IO threads to perform a remote access to the shared memory metadata via the inter-nodal fabric responsive to determining that the shared memory metadata is remote relative to the first IO thread.

This summary is not intended to limit the scope of the claims or the disclosure. Other aspects, features, and implementations will become apparent in view of the detailed description and figures. Moreover, all the examples, aspects, implementations, and features can be combined in any technically possible way.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
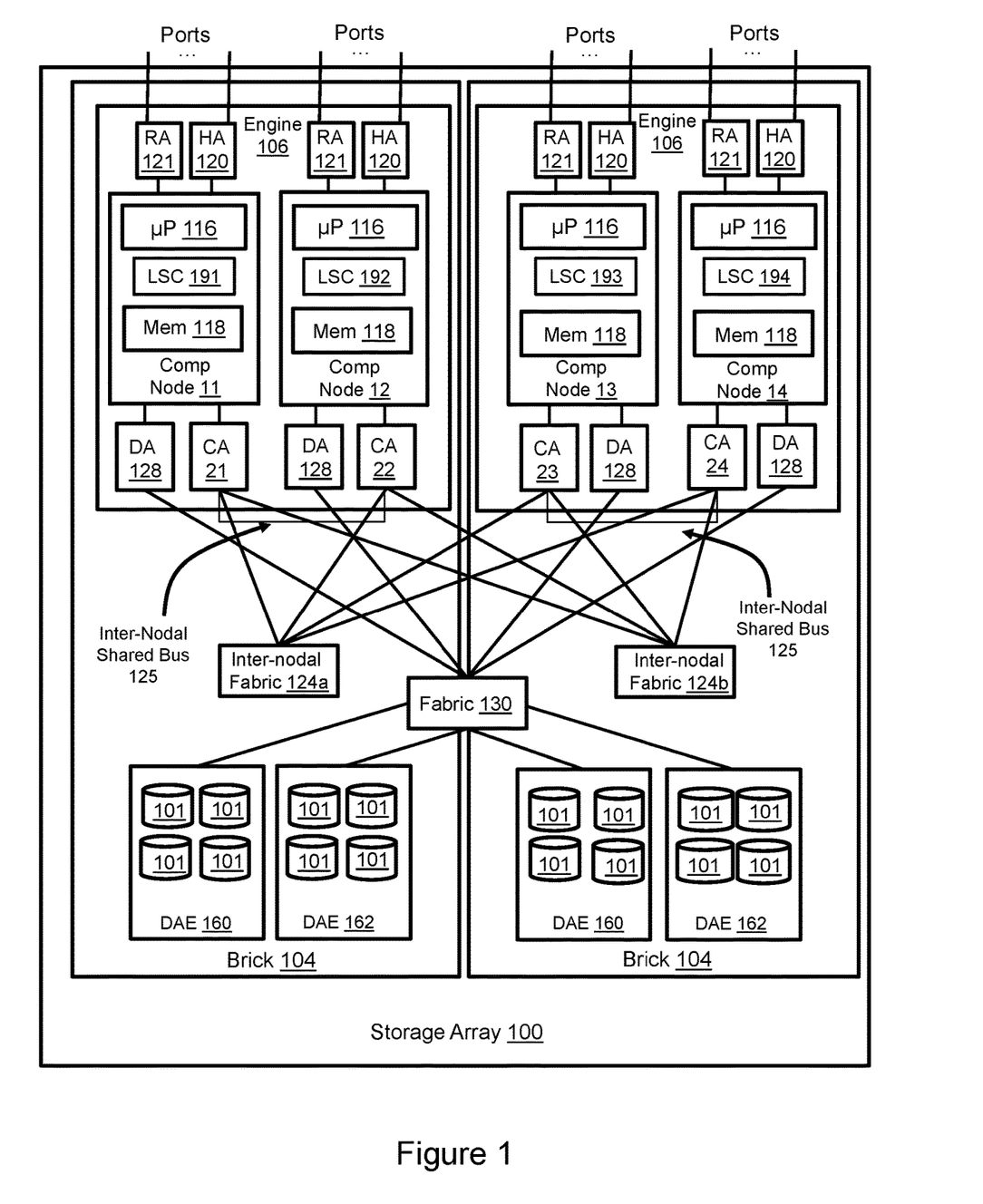
FIG. 1 illustrates a multi-node storage system with a fabricless local access mode.

FIG. 1 illustrates a multi-node storage system with a fabricless local access mode. The multi-node storage system will hereafter be described as a storage array, but the concepts disclosed herein are not limited to storage arrays. The storage array 100 includes one or more bricks 104. Each brick 104 includes an engine 106 and one or more disk array enclosures (DAEs) 160, 162. In the illustrated example there are only two engines, but the storage array could include a greater number of engines or a single engine. Each engine 106 includes two interconnected compute nodes 11, 12 that are arranged as a memory-mirrored pair for failover and may be referred to as "storage directors." Each compute node may be implemented on a separate printed circuit board ("motherboard" or "blade") and has hardware resources including at least one multi-core processor 116 and local memory 118. The multi-core processor may include central processing units (CPUs), graphics processing units (GPUs), or both installed via multiple sockets. The local memory 118, which is not CPU cache, may include volatile media such as dynamic random-access memory (DRAM), non-volatile memory (NVM) such as storage class memory (SCM), or both. Each compute node includes one or more host adapters (HAs) 120 for communicating with external host servers. Each host adapter has multiple ports for communicating with the host servers, which may be referred to as "initiators" that send IO commands to the storage array as a "target." Each initiator-target port pair defines a path. Each host server may be connected to the storage array via multiple ports corresponding to multiple paths that enable load balancing and failover. The host adapter resources include processors, volatile memory, and components such as IO chips that monitor link errors and IO failures such as missing frames, timeouts, and received aborts. Each compute node also includes a remote adapter (RA) 121 with ports for communicating with other storage systems, e.g., other storage arrays. Each compute node also includes one or more disk adapters (DAs) 128 for communicating with managed drives 101 in the DAEs 160, 162. Each disk adapter has processors, volatile memory, and ports via which the compute node may access the DAEs for servicing IOs. Each compute node also includes one or more multi-host capable channel adapters (CAs) 21, 22, 23, 24 for communicating with other compute nodes via redundant inter-nodal InfiniBand (IB) fabrics 124a, 124b. There are also inter-nodal shared busses 125 between the channel adapters within each engine 106. The managed drives 101 include non-volatile storage media that may be of any type, e.g., solid-state drives (SSDs) based on EEPROM technology such as NAND and NOR flash memory and hard disk drives (HDDs) with spinning disk magnetic storage media. Disk controllers may be associated with the managed drives as is known in the art. An interconnecting fabric 130 enables implementation of an N-way active-active backend. In some implementations, every disk adapter 128 in the storage array can reach every DAE via the fabric 130. Further, in some implementations every disk adapter in the storage array can access every managed drive 101.

Figure 2:
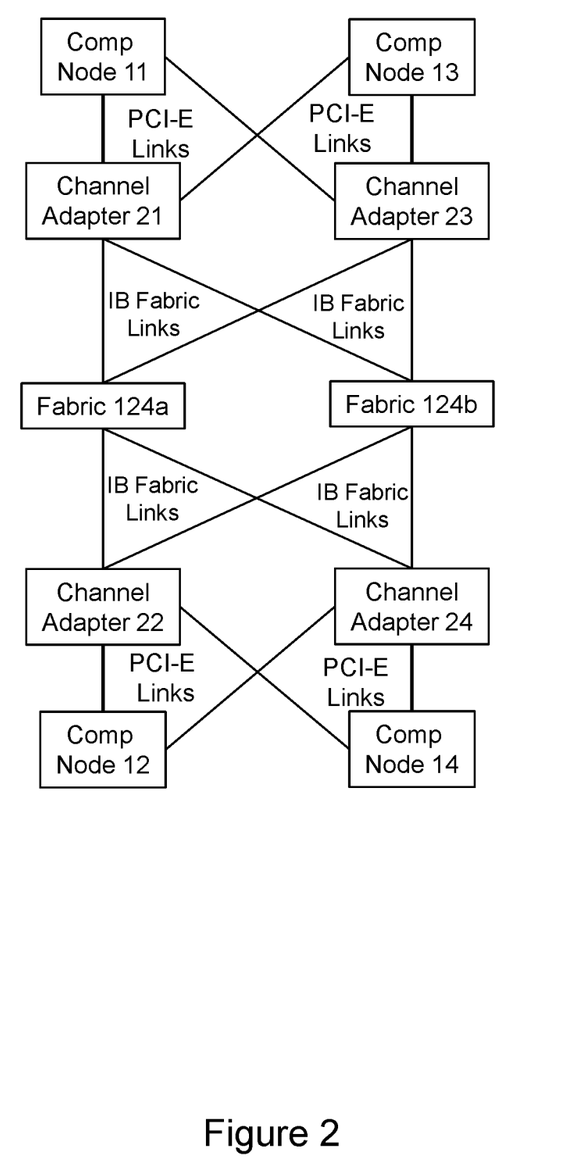
FIG. 2 illustrates inter-nodal links of the storage system of FIG. 1.

FIG. 2 illustrates inter-nodal links of the storage system of FIG. 1. The inter-nodal links that interconnect the channel adapters 21, 22, 23, 24 are on redundant fabrics 124a, 124b that comply with the InfiniBand standard. InfiniBand is a switched fabric architecture that uses switch nodes to transport messages between end nodes. The channel adapters are multi-host capable and the inter-nodal shared bus links between each multi-socket compute node host and its associated channel adapter, e.g., between compute node 11 and channel adapter 21, comply with the Peripheral Component Interconnect Express (PCI-E) standard (or ultra path interconnect (UPI), QuickPath Interconnect (QPI), or Hyper-Transport, for example, and without limitation). PCI-E is a shared bus architecture via which packets are transported between endpoints. The channel adapters from different compute node motherboards associated with a single engine are also connected to the other compute node of the engine via different shared bus PCI-E links, e.g., channel adapter 21 is connected to compute node 13 via a PCI-E shared bus. In general, communications associated with IOs such as memory access operations are subjected to greater latency when sent across inter-nodal fabric links than shared bus links, e.g., by an order of magnitude.

Figure 3:
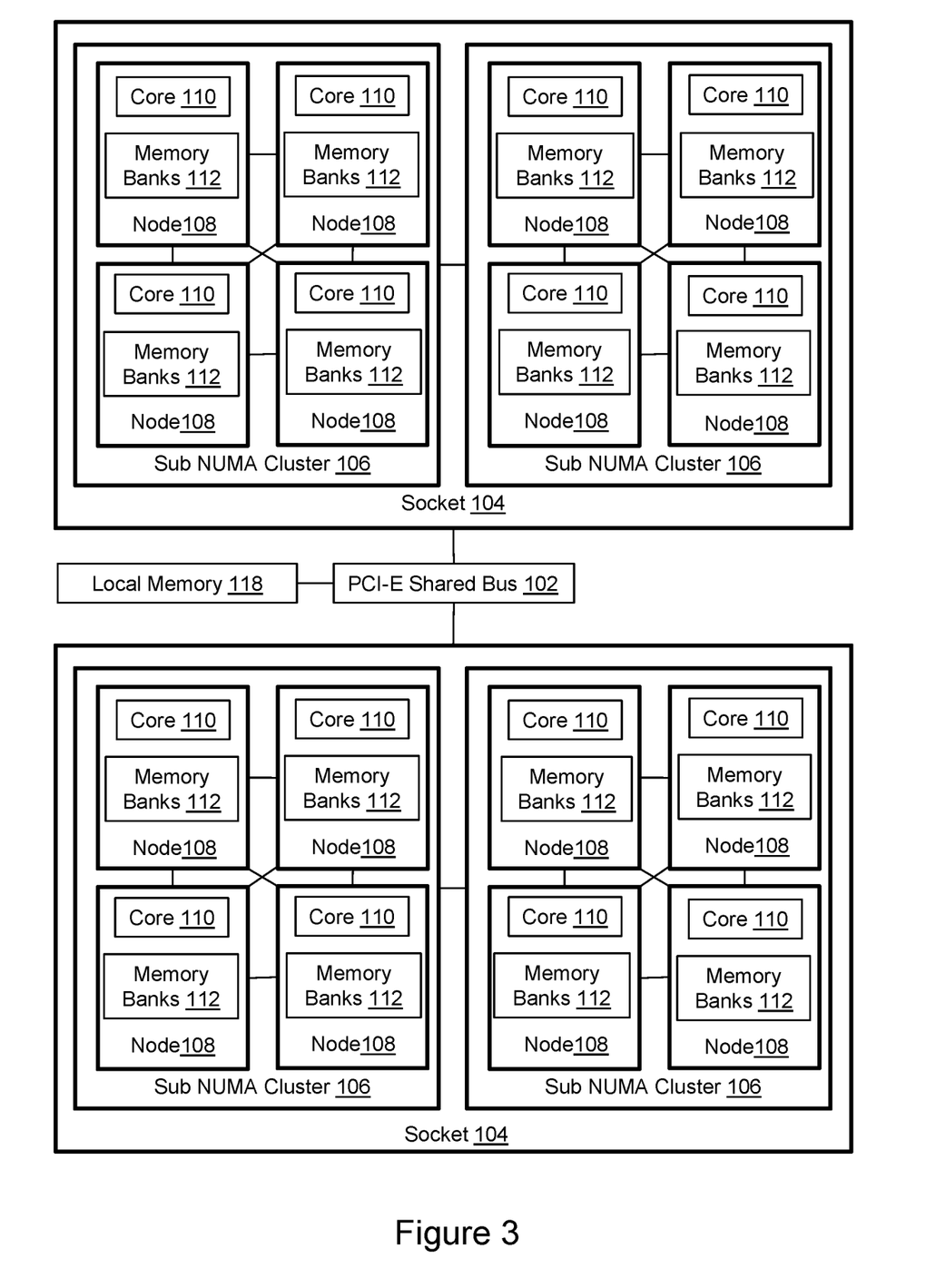
FIG. 3 illustrates intra-nodal links of the storage system of FIG. 1.

FIG. 3 illustrates intra-nodal links of the storage system of FIG. 1. Each compute node includes multiple sockets 104 on a single motherboard, each with one package including one or more CPU dies mounted therein. The sockets 104 are interconnected with each other and local memory 118 via a shared PCI-E bus 102 (or ultra path interconnect (UPI), QuickPath Interconnect (QPI), or HyperTransport, for example, and without limitation). Each socket 104 is organized into multiple sub-non-uniform memory access (NUMA) clusters (SNCs) 106 that are interconnected via inter-die links and on-die mesh interconnects. Each sub-NUMA cluster includes multiple core nodes 108 that are interconnected via another on-die mesh interconnect. Each core node 108 includes a processor core 110 and memory banks 112. The memory banks include the onboard L1 cache, nearby chip-based L1/L2 cache, and the L3 cache part of main memory that the NUMA configuration provides to the core based on locality.

In the context of the present disclosure, a shared memory access is "local" only if it can be performed in its entirety without using the inter-nodal fabric. For example, a shared memory access that is performed with mutual exclusion via a shared bus without using the internodal fabric is "local." A shared memory access that utilizes the inter-nodal fabric in any way is "non-local," e.g., a same-board write to memory that uses the inter-nodal fabric for global mutual exclusion is non-local. As will be explained below, access to a slot and associated metadata in shared memory may be configured as local or non-local based on dynamically changing circumstances.

Figure 4:
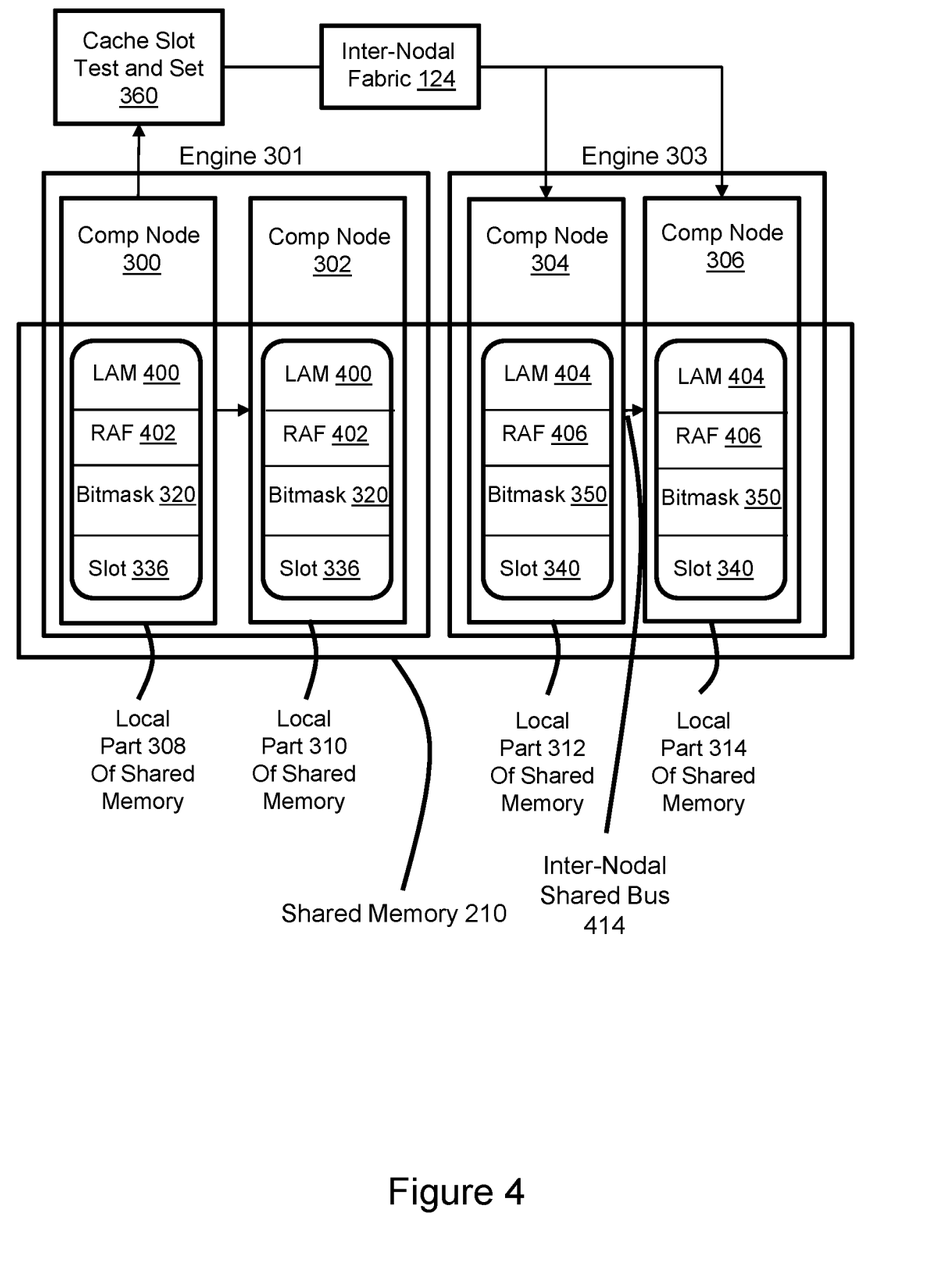
FIG. 4 illustrates aspects of inter-nodal and intra-nodal memory access.

FIG. 4 illustrates aspects of inter-nodal and intra-nodal memory access. A first engine 301 includes paired compute nodes 300, 302. A second engine 303 includes paired compute nodes 304, 306. As previously mentioned, each compute node allocates a portion of its local memory 116 (FIG. 1) to a shared memory 210 that can be accessed by all compute nodes of the storage array. The shared memory includes partitions for data and metadata. The data is maintained in logical addresses called slots. Compute node 304 might initially copy an extent of data into a slot 340 in its local memory (pursuant to memory affinity) and create associated metadata to service an IO and compute node 300 might subsequently update that extent by writing data to slot 340 and updating the associated metadata in shared memory using RDMA. Because IO threads run concurrently on all cores, a system-wide mutual exclusion technique is implemented to enable local and non-local access to the shared memory without conflict. For example, system-wide mutual exclusion enables the IO threads running on the cores of compute nodes 300, 304 that are non-local relative to slot 340 to access slot 340 without conflict with local IO threads and other non-local IO threads. Temporary system-wide ownership of slots and associated metadata in the shared memory can be indicated by bitmasks 320, 350. Ownership of slot 340 and its metadata can be obtained by an IO thread/core on compute node 300 by setting a bit in the bitmask 350 corresponding to slot 340. The bitmask 350 is updated by sending a slot test-and-set message 360 via the inter-nodal fabric 124 which attempts to set the bit and returns a value indicative of whether the attempt was successful. When ownership of a slot is obtained by an IO thread/core, none of the other IO threads/cores can write to that slot or update its metadata. After the data and/or metadata has been updated, ownership is released by updating the bitmask via the inter-nodal fabric 124. If system-wide ownership is already claimed by another IO thread, then other IO threads must wait to claim ownership of the slot.

Because communications via the inter-nodal IB fabric 124 experience greater latency than communications via the shared bus PCI-E links, a local mutual exclusion technique is implemented to enable IO threads to update local memory resources such as slot 340 and its associated metadata without using the inter-nodal IB fabric 124 in certain circumstances. The metadata in the local part 312 of shared memory 210 where slot 340 exists includes local access mode bits and remote access request flags associated with local slots, e.g., a local access mode bit 404 and a remote access request flag 406 associated with slot 340. The local access mode bit 404 indicates whether fabricless local memory access to slot 304 is enabled or disabled. Fabricless local memory access relies on the local mutual exclusion lock, e.g., a Peterson Lock, to avoid conflict between concurrent local IO threads/cores competing for fabricless access to slots. Setting the local access mode bit allows all contention-free PCI-E-only local accesses to the slot and associated metadata to be performed as atomic PCI-E read/write operations without use of the inter-nodal IB fabric 124. Note that this includes accesses via inter-nodal shared bus 414 PCI-E between the paired compute nodes 304, 306 of engine 303. Disabling the local access mode bit causes all accesses to the slot to be performed using the system-wide fabric-based mutual exclusion. The remote access request flag 406 is set by an IO thread/core to initiate a remote access via the inter-nodal fabric 124. If a local IO thread/core obtains the local mutual exclusion lock for a slot and then determines that the remote access request flag for that slot is set, the local IO thread/core releases the local mutual exclusion lock and the local access mode for the slot is disabled in order to allow the remote access to proceed. The remote access flag is unset, and local access mode is enabled when the remote access is complete. Because most accesses to shared memory are local, i.e., intra-nodal or via inter-nodal PCI-E links, the local mutual exclusion techniques enable most accesses to shared memory to be implemented without sending communications via the inter-nodal IB fabric, thereby reducing overall IO latency, and improving storage system performance.

Because the local part 308 of shared memory is mirrored by the local part 310 of shared memory within engine 301, the local access mode bits, remote access request flags, bitmasks, and slots are mirrored in local parts 308, 310. Similarly, the local part 312 of shared memory is mirrored by local part 314 of shared memory within engine 303, so the local access mode bits 404, remote access request flags 406, bitmasks 350, and slots 340 are mirrored. Mirroring may be implemented via the inter-nodal shared PCI-E bus links within each engine.

Figure 5:
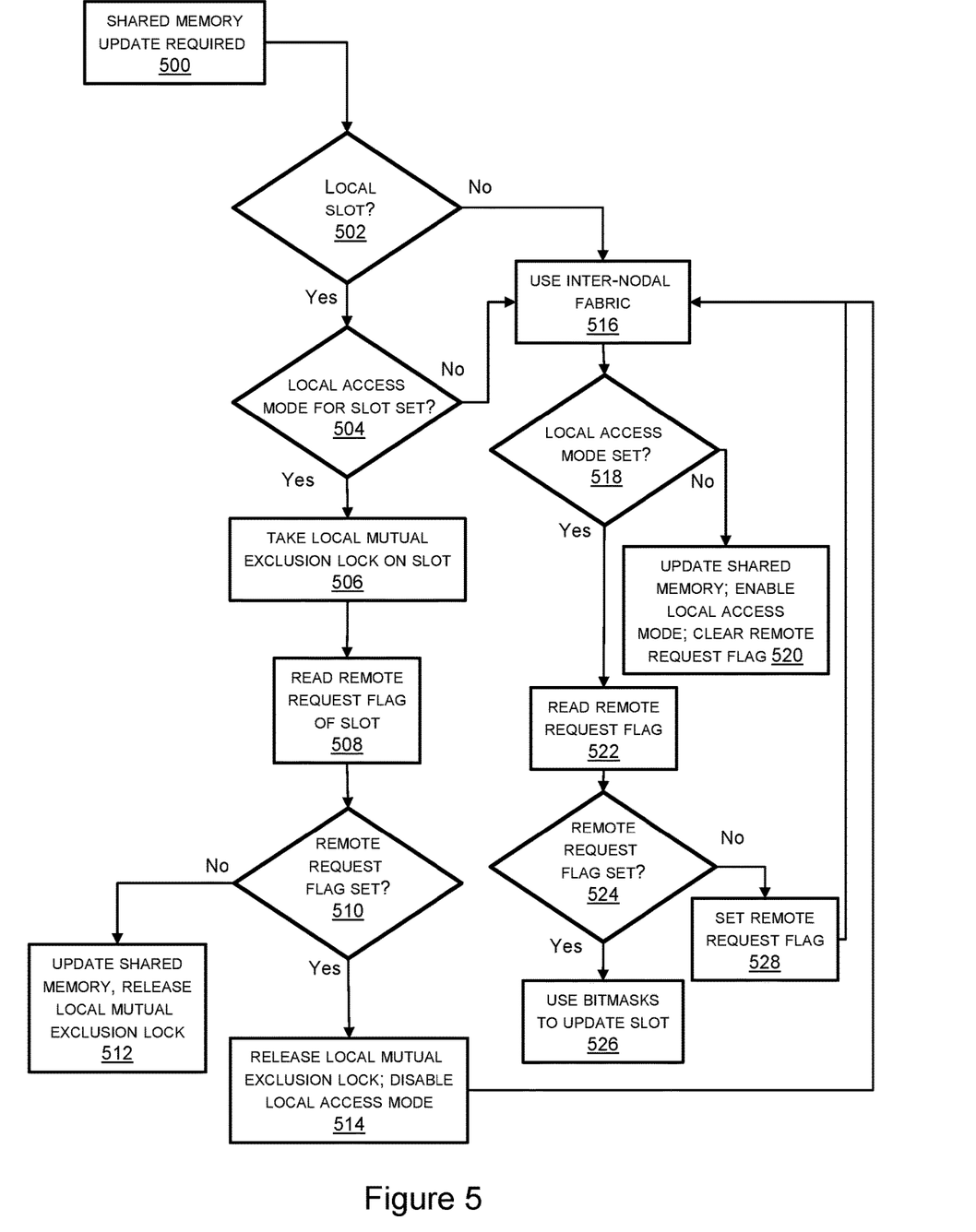
FIG. 5 illustrates a method for performing memory access in a multi-node architecture.

FIG. 5 illustrates a method for performing memory access in a multi-node architecture. Responsive to a requirement for an IO thread to update a slot of shared memory as indicated in step 500, a determination is made in step 502 whether that slot is local relative to the IO thread. The slot is local relative to the IO thread if the slot can be accessed by the IO thread without using the inter-nodal fabric. Thus, slots on the same compute node motherboard on which the IO thread is running are local and slots on a paired compute node motherboard of the same engine that can be reached by an inter-nodal shared bus are local. If the slot is determined to be local to the IO thread, then step 504 is determining whether the local access mode bit for the slot is set, i.e., whether local access to the slot and associated metadata is currently enabled. If the determination is yes, then the IO thread takes (or waits for and later takes pursuant to the local mutual exclusion algorithm) the local mutual exclusion lock on the slot as indicated in step 506. The remote request flag associated with the slot is read in step 508. If the remote request flag for the slot is determined to not be set in step 510, then the IO thread updates the slot by writing data and associated metadata in shared memory using the shared bus and releases the local mutual exclusion lock as indicated in step 512, thereby completing the shared memory update without utilizing the inter-nodal fabric. If it is determined in step 510 that the remote request flag for the slot is set, then step 514 is releasing the local mutual exclusion lock and disabling the local access mode for the slot. The local mutual exclusion lock is released without first updating the slot. A "No OP" or memory miscompare/failure is returned to the caller IO thread. This is done because the local process has effectively raced with the remote process which has already broadcast a system-wide request to perform a fabric-based memory update, so it is no longer safe to attempt a local memory update. Failing to take the Peterson Lock would also prompt a "No OP" or failure to caller after failure to obtain the lock for a predetermined period of time.

Flow proceeds from step 514 to step 516, and the inter-nodal fabric is used to implement non-local mutual exclusion. The inter-nodal fabric is also used if the slot is not local relative to the IO thread as determined in step 502 or if the local access mode for the slot is not set as determined in step 504. When the inter-nodal fabric is used, step 518 is determining whether the local access mode is set. If the answer is no, then a previously set remote access flag may have been acted upon by disabling local access mode. The slot and associated metadata in shared memory are updated as indicated in step 520, e.g., using the grant of the remote request or the bitmasks for non-local mutual exclusion. If the local access mode is set, then step 522 is reading the remote request flag. If the remote request flag is not set, as determined in step 524, then step 528 is setting the remote request flag. It should be understood that a first non-local IO thread using the inter-nodal fabric for remote access to a slot might loop by first determining that the local access mode is enabled, setting the remote access flag in response, and later determining that the local access mode is disabled. Concurrently, a second local IO thread that had the local mutual exclusion lock will have released that lock responsive to detecting that the remote request flag was set, and local access mode will have been disabled. If it is determined in step 524 that the remote request flag is set, then multiple threads may be attempting remote access and the bitmasks are used to claim temporary ownership and update the slot via the inter-nodal fabric as indicated in step 526.

Although the inventive concepts have been described in the context of accesses to slots in shared memory, that context should not be viewed as limiting. Aspects of the concepts described herein might be applied to access to any shared resource for which local and non-local accesses are performance-differentiated by creating local and non-local access modes.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

Internal Use-Confidential

What is claimed is:

1. A method, comprising:
   identifying a need for a first IO thread to access metadata in a shared memory that is accessible by a plurality of IO threads running on a plurality of processor cores on a plurality of compute nodes that are interconnected by an inter-nodal fabric, where the compute nodes each have local memory and allocate a portion of their local memory to the shared memory;
   using local mutual exclusion between ones of the plurality of IO threads that are local relative to the shared memory metadata to perform fabricless local access to the shared memory metadata responsive to determining that the shared memory metadata is local to the first IO thread; and
   using non-local mutual exclusion between ones of the plurality of IO threads to perform a remote access to the shared memory metadata via the inter-nodal fabric responsive to determining that the shared memory metadata is remote relative to the first IO thread.

2. The method of claim 1 further comprising accessing the shared memory metadata via a shared bus to perform local access.

3. The method of claim 2 further comprising using the inter-nodal fabric for non-local mutual exclusion to perform remote access.

4. The method of claim 3 further comprising enabling and disabling a local access mode indicator to enable and disable local access to the shared memory metadata.

5. The method of claim 4 further comprising setting a remote access request flag to signal that a remote one of the plurality of IO thread needs to access the shared memory metadata.

6. The method of claim 5 further comprising disabling the local access mode for the shared memory metadata responsive to detecting that the remote access request flag for the shared memory metadata is set.

7. The method of claim 6 further comprising clearing the remote access request flag and enabling the local access mode for the shared memory metadata after completing remote access to the shared memory metadata.

8. An apparatus comprising:
   a plurality of compute nodes interconnected via an inter-nodal fabric and configured to manage access to non-volatile drives, each of the compute nodes comprising a plurality of processor cores, each with an IO thread, and local memory, a portion of which is allocated to a shared memory that is accessible to all the IO threads, the IO threads configured to use fabricless local mutual exclusion in association with fabricless local access to shared memory metadata in the shared memory and use non-local mutual exclusion in association with remote access to shared memory metadata in the shared memory via the inter-nodal fabric.

9. The apparatus of claim 8 further comprising the IO threads configured to use a shared bus to perform local access.

10. The apparatus of claim 9 further comprising the IO threads configured to use the inter-nodal fabric to implement non-local mutual exclusion.

11. The apparatus of claim 10 further comprising a thread configured to enable and disable local access mode indicators to enable and disable local access to shared memory metadata in the shared memory.

12. The apparatus of claim 11 further comprising a thread configured to set a remote access request flag to signal that a remote IO thread needs to access the shared memory metadata.

13. The apparatus of claim 12 further comprising a thread configured to disable the local access mode for the shared memory metadata responsive to the remote access request flag for the shared memory metadata being set.

14. The apparatus of claim 13 further comprising a thread configured to clear the remote access request flag and enable the local access mode for the shared memory metadata after completion of remote access to the shared memory metadata.

15. A non-transitory computer-readable storage medium storing instructions that are executed by a storage system to perform a method comprising:
   identifying a need for a first IO thread to access shared memory metadata in a shared memory that is accessible by a plurality of IO threads running on a plurality of processor cores on a plurality of compute nodes that are interconnected by an inter-nodal fabric, where the compute nodes each have local memory and allocate a portion of their local memory to shared memory;
   using local mutual exclusion between ones of the plurality of IO threads that are local relative to the shared memory metadata to perform fabricless local access to the shared memory metadata responsive to determining that the shared memory metadata is local to the first IO thread; and
   using non-local mutual exclusion between ones of the plurality of IO threads to perform a remote access to the shared memory metadata via the inter-nodal fabric responsive to determining that the shared memory metadata is remote relative to the first IO thread.

16. The non-transitory computer-readable storage medium of claim 15 in which the method further comprises accessing the shared memory metadata via a shared bus to perform local access.

17. The non-transitory computer-readable storage medium of claim 16 in which the method further comprises using the inter-nodal fabric for non-local mutual exclusion to perform remote access.

18. The non-transitory computer-readable storage medium of claim 17 in which the method further comprises enabling and disabling a local access mode indicator to enable and disable local access to the shared memory metadata.

19. The non-transitory computer-readable storage medium of claim 18 in which the method further comprises setting a remote access request flag to signal that a remote one of the plurality of IO thread needs to access the shared memory metadata.

20. The non-transitory computer-readable storage medium of claim 19 in which the method further comprises disabling the local access mode for the shared memory metadata responsive to detecting that the remote access request flag for the shared memory metadata is set and clearing the remote access request flag and enabling the local access mode for the shared memory metadata after completing remote access to the shared memory metadata.

\* \* \* \* \*